(12) United States Patent
Huizenga et al.

(10) Patent No.: US 8,200,999 B2
(45) Date of Patent: Jun. 12, 2012

(54) SELECTIVE POWER REDUCTION OF MEMORY HARDWARE

(75) Inventors: Gerrit Huizenga, Portland, OR (US);
Vivek Kashyap, Beaverton, OR (US);
Badari Pulavarty, Beaverton, OR (US);
Russell H. Weight, Hillsboro, OR (US)

(73) Assignee: International Business Machines Corporation, Armonk, NY (US)

( * ) Notice: Subject to any disclaimer, the term of this patent is extended or adjusted under 35 U.S.C. 154(b) by 485 days.

(21) Appl. No.: 12/189,243

(22) Filed: Aug. 11, 2008

(65) Prior Publication Data

US 2010/0037073 A1 Feb. 11, 2010

(51) Int. Cl.
*G06F 1/26* (2006.01)
*G06F 1/32* (2006.01)
*G06F 1/00* (2006.01)

(52) U.S. Cl. ........................ 713/320; 713/324

(58) Field of Classification Search .................. 713/320, 713/324
See application file for complete search history.

(56) References Cited

U.S. PATENT DOCUMENTS

| | | | | |
|---|---|---|---|---|
| 5,524,248 A * | 6/1996 | Parks et al. | .................. | 713/324 |
| 5,761,659 A * | 6/1998 | Bertoni | .................. | 1/1 |
| 5,968,136 A * | 10/1999 | Saulpaugh et al. | .............. | 710/3 |
| 6,163,847 A * | 12/2000 | Yoon et al. | .................... | 713/320 |
| 6,237,072 B1 * | 5/2001 | Houlsdworth | ................ | 711/171 |
| 6,330,639 B1 * | 12/2001 | Fanning et al. | .............. | 711/106 |
| 6,742,097 B2 * | 5/2004 | Woo et al. | ..................... | 711/170 |
| 6,760,810 B2 | 7/2004 | Yamazaki et al. | | |
| 6,826,670 B2 | 11/2004 | Middleton et al. | | |
| 7,003,640 B2 | 2/2006 | Mayo et al. | | |
| 7,010,656 B2 * | 3/2006 | Gupta | ........................... | 711/165 |
| 7,028,200 B2 * | 4/2006 | Ma | ................................ | 713/324 |
| 7,124,308 B2 * | 10/2006 | Shiiyama | ..................... | 713/300 |
| 7,272,734 B2 * | 9/2007 | Gooding | ....................... | 713/320 |
| 7,310,740 B2 * | 12/2007 | Price et al. | .................... | 713/320 |
| 7,421,598 B2 * | 9/2008 | Brittain et al. | ................ | 713/320 |
| 7,451,303 B2 * | 11/2008 | Biondi et al. | ..................... | 713/2 |
| 7,571,295 B2 * | 8/2009 | Sakarda et al. | .............. | 711/165 |
| 7,788,513 B2 * | 8/2010 | Vaden et al. | .................. | 713/320 |
| 2001/0026465 A1 | 10/2001 | Choi et al. | | |
| 2003/0005257 A1 * | 1/2003 | Wilson et al. | ................ | 711/205 |
| 2004/0008564 A1 | 1/2004 | Tsuda et al. | | |
| 2004/0268031 A1 * | 12/2004 | Lawrence | ..................... | 711/106 |

(Continued)

FOREIGN PATENT DOCUMENTS

JP 62264346 A * 11/1987

(Continued)

OTHER PUBLICATIONS

Kawabe, N.; Usami, K.; , "Low-power technique for on-chip memory using biased partitioning and access concentration," Custom Integrated Circuits Conference, 2000. CICC. Proceedings of the IEEE 2000 , pp. 275-278, 2000.*

(Continued)

*Primary Examiner* — Faisal M Zaman
(74) *Attorney, Agent, or Firm* — Lieberman & Brandsdorfer, LLC

(57) ABSTRACT

Managing delivery of power to one or more hardware memory devices in a computer system. The computer system is configured with a processor and at least two hardware memory devices. An energy exchange threshold for the computer system is set, and management of one or more of the hardware memory devices is employed when the computer system exceeds an energy exchange threshold.

20 Claims, 6 Drawing Sheets

U.S. PATENT DOCUMENTS

| | | | | |
|---|---|---|---|---|
| 2004/0268166 | A1* | 12/2004 | Farkas et al. | 713/320 |
| 2005/0018568 | A1* | 1/2005 | Tsuda et al. | 369/47.32 |
| 2006/0005057 | A1* | 1/2006 | Nalawadi et al. | 713/320 |
| 2006/0117160 | A1* | 6/2006 | Jackson et al. | 711/170 |
| 2007/0147165 | A1 | 6/2007 | Kato | |
| 2007/0230255 | A1* | 10/2007 | Fukuda | 365/189.05 |
| 2007/0294550 | A1* | 12/2007 | May et al. | 713/320 |
| 2008/0005516 | A1* | 1/2008 | Meinschein et al. | 711/165 |
| 2008/0104437 | A1* | 5/2008 | Lee | 713/323 |
| 2008/0195875 | A1* | 8/2008 | Hobson | 713/320 |
| 2008/0313482 | A1* | 12/2008 | Karlapalem et al. | 713/324 |
| 2008/0316197 | A1* | 12/2008 | Ds | 345/212 |

FOREIGN PATENT DOCUMENTS

| | | | | |
|---|---|---|---|---|
| JP | 01267710 | A | * | 10/1989 |
| JP | 2009104391 | A | * | 5/2009 |
| JP | 2011090642 | A | * | 5/2011 |

OTHER PUBLICATIONS

Tessier, R.; Betz, V.; Neto, D.; Egier, A.; Gopalsamy, T.; , "Power-Efficient RAM Mapping Algorithms for FPGA Embedded Memory Blocks," Computer-Aided Design of Integrated Circuits and Systems, IEEE Transactions on , vol. 26, No. 2, pp. 278-290, Feb. 2007.*

Panda, P.R.; Dutt, N.D.; , "Low-power memory mapping through reducing address bus activity," Very Large Scale Integration (VLSI) Systems, IEEE Transactions on , vol. 7, No. 3, pp. 309-320, Sep. 1999.*

Cong, J.; Wei Jiang; Bin Liu; Yi Zou; , "Automatic memory partitioning and scheduling for throughput and power optimization," Computer-Aided Design—Digest of Technical Papers, 2009. ICCAD 2009. IEEE/ACM International Conference on , pp. 697-704, Nov. 2-5, 2009.*

* cited by examiner

SELECTIVE POWER REDUCTION OF MEMORY HARDWARE

BACKGROUND OF THE INVENTION

1. Technical Field

This invention relates to managing power consumption of hardware memory devices. More specifically, the invention relates to controlling availability of hardware memory devices based upon usage and associated power consumption thereof.

2. Description of the Prior Art

Main memory is defined as an internal storage area in a computer. The term main memory identifies data storage that comes in the form of a chip. It is identified with physical memory, which refers to actual hardware in the form of microchips capable of holding data. The term storage memory identifies memory that exists on tapes or disks. Every computer is configured with a certain amount of physical memory. There are several different types of memory, including RAM, ROM, PROM, EPROM, and EEPROM. RAM is an acronym for random access memory and it is the same as main memory. When used by itself, the term RAM refers to read and write memory, indicating that a programmer can both write data into RAM and read data from RAM. Most RAM is volatile in that it requires a steady flow of electricity to maintain its contents. As soon as power is turned off, whatever data stored in RAM is lost. ROM is an acronym for read only memory. Computers almost always contain a small amount of read-only memory that holds instructions for starting up the computer. Unlike RAM, ROM cannot be written to more than one time. PROM is an acronym for programmable read-only memory. A PROM chip is a memory chip on which you can store data or a program. Once the PROM has been used, you cannot wipe it clean and use it to store something else. Like ROMs, PROMs are non-volatile. EPROM is an acronym for erasable programmable read-only memory. An EPROM is a special type of PROM that can be erased by exposing it to ultraviolet light. EEPROM is an acronym for electrically erasable programmable read-only memory. An EEPROM is a special type of PROM that can be erased by exposing it to an electrical charge. Accordingly, there are different types of memory hardware wherein one or more of them may be employed within a computer.

As noted above, in addition to memory hardware there is storage and associated storage hardware, also known as secondary storage. It is known in the art to store data on hardware, such as tapes, disk, optical storage, flash drives, etc. Secondary storage is different from memory hardware in that it is not directly accessible by the central processing unit. The computer usually uses its input/output channels to access secondary storage. Secondary storage does not lose data when the device is powered down. Accessing data from secondary storage is not as fast as accessing data from main memory.

There are techniques employed to manage power consumption of computer machines. Such techniques include reducing the operating speed of a hard disk to an idle state when access to the hard disk is not required and increasing the operating speed of the hard disk when access to the hard disk is required. Management of the speed of the hard disk enables greater operating efficiency of a computer machine. It is also known in the art to manage power consumption of a computer machine by managing the speed of a processor. For example one of the features present on laptop and desktop computers is the ability of the computer to be placed in a low power state of operation, such as Suspend and Hibernate. In the Suspend state, power to the processor is turned off, but the memory remains intact. This is a state of low power consumption. When the operator of the computer wants to regain usage of the hardware accessory, the operator must Restore full power to the processor. A full system restart is not necessary since the memory remains intact. In addition to the Suspend state, the computer may also be placed in the low power state of Hibernate, where power to the computer is turned off following placement of memory to disk. In general, it is less time consuming to enter the Suspend state and restore power to the computer or to enter the Hibernate state and resume power to the computer, than to terminate power to the computer and restart the full system at a later time. Accordingly, there are tools that are employed to manage the power consumption through control of the operating state of the processor.

As noted above, current power management techniques address management of the processor speed. However, the prior art does not address power consumption of hardware memory devices in the computer. Current architectures include the ability to measure power consumption and thermal characteristics of components within the system. Accordingly, there is a need to expand power management from beyond the processor and to apply it to other hardware elements in the computer system and to bring power management into the domain of the operating system.

SUMMARY OF THE INVENTION

This invention comprises a system, method, and article for management of delivery of power to computer memory hardware devices.

In one aspect of the invention, a computer system is provided with a processor and at least two hardware memory devices in communication with the processor. A tool to monitor energy exchange by the hardware memory devices is provided. An operating system in communication with the processor, the memory devices, and the energy monitor tool selectively controls delivery of power to at least one of the memory devices responsive to a read of the energy monitor tool. At least one hardware memory device is selected for reduction of power.

In another aspect of the invention, a method is provided for managing memory hardware devices of a computer system. The computer system is configured with a processor in communication with at least two hardware memory devices and an associated operating system. Energy exchange readings of the hardware memory devices are monitored. Instructions are communicated to control delivery of power to at least one of the hardware memory devices responsive to the monitored energy readings, followed by selection of at least one hardware memory device for reduction of power.

In yet another aspect of the invention, an article is provided with a computer readable carrier including computer program instructions configured to manage hardware memory devices. Instructions are provided to configure a computer system with a processor in communication with at least two hardware memory devices and an associated operating system. In addition, instructions are provided to monitor energy exchange of the hardware memory devices. In response to the energy exchange reading, instructions are provided to control delivery of power to at least one of the hardware memory devices, followed by selection of at least one hardware memory device for reduction of power.

In an even further aspect of the invention, a method is provided for managing memory hardware devices of a computer system. A computer system is configured with a processor in communication with a hardware memory device and BIOS in communication with the hardware memory device and an associated operating system. The hardware memory device is configured with at least two manageable components. Energy exchange reading of the hardware memory device is monitored. Instructions from the BIOS are communicated to at least one component of the hardware memory devices to control delivery of power to at least one component of hardware memory device responsive to the monitored energy reading. Thereafter, at least one component of the hardware memory device is selected for removal of power.

Other features and advantages of this invention will become apparent from the following detailed description of the presently preferred embodiment of the invention, taken in conjunction with the accompanying drawings.

DESCRIPTION OF THE PREFERRED EMBODIMENT

Overview

Computer workstations as well as personal computers generally include a motherboard with one or more hardware memory devices. Controlling the delivery of power to the hardware memory devices manages energy exchange in the individual computer workstation or personal computer. Prior to removing power from one or more hardware memory devices, it may be necessary to relocate data present on the subject hardware memory device, if relocation is necessary to maintain the data. Following relocation and/or management of the data, power may be removed from the select hardware memory device. Accordingly, delivery of power to hardware memory devices may be employed to manage energy exchange of an individual computer workstation or personal computer.

Technical Details

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

Reference is made to energy exchange employed in a computer system. In a computer system, the processors and associated hardware require electrical energy supply to operate. At the same time, the processors and hardware create an energy byproduct as a characteristic of use and operation. The term energy exchange used herein is understood to include, but is not limited to, power consumed by hardware use and energy byproduct. In one embodiment, energy byproduct includes, but is not limited to, heat, light, and electromagnetic radiation.

There are different tools that may be employed to maintain thermal output of a computer system, whether it is an individual computer workstation or an aggregation of workstations. Prior art thermal management systems address processor clock adjustment and processor speed adjustment. The invention disclosed herein addresses energy exchange of the hardware memory devices and management thereof. In the illustrations provided herein and discussed below, the embodiments employ the terms thermal and temperature output in place of energy exchange. It is hereby understood that thermal output and temperature output are forms of energy exchange, and are used herein as examples. The use of these terms are interchangeable and do not limit the scope of the invention. Accordingly, the terms thermal output, temperature output, and thermal measurement are examples of energy exchange.

Figure 1:
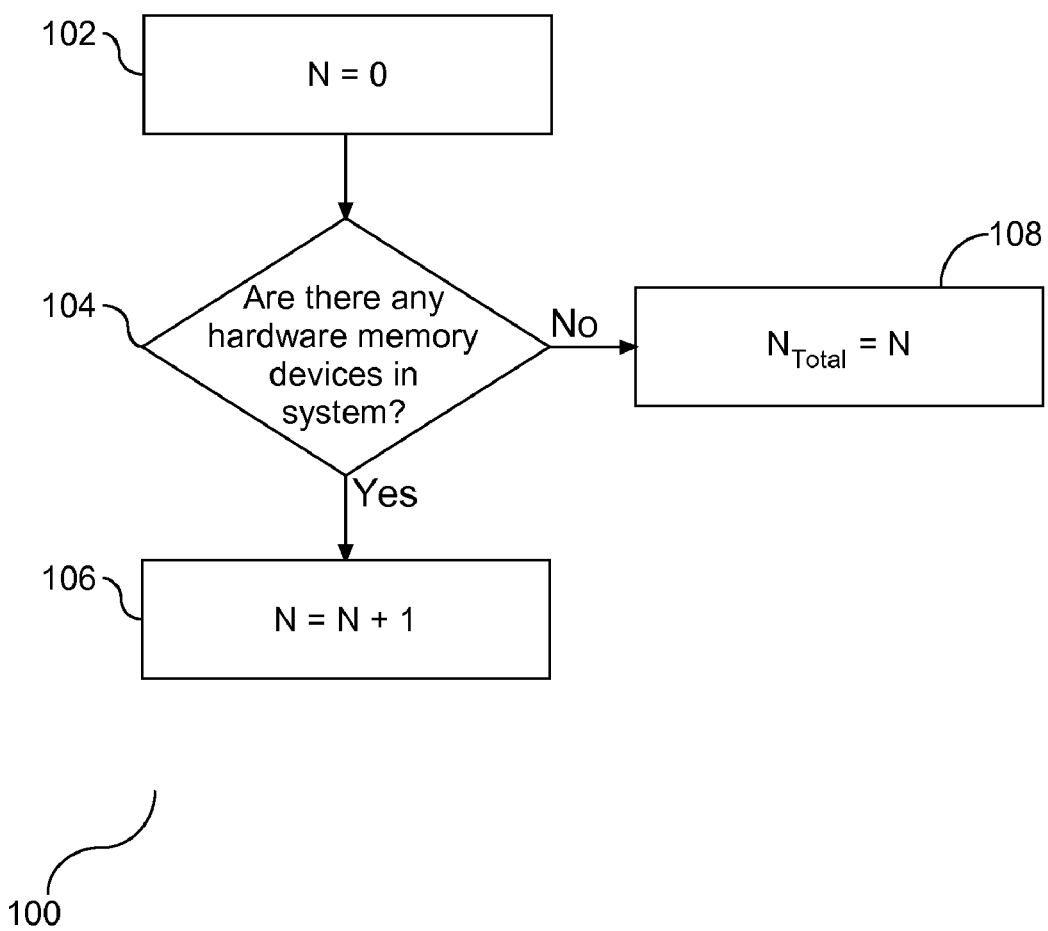
FIG. 1 is a flow chart illustrating identification of hardware memory devices in a computer system.

FIG. 1 is a flow chart (100) that introduces management of hardware memory devices in a computer system. Before the hardware devices can be managed, the quantity of hardware devices must be ascertained. The initial process identifies all of the hardware memory devices present in the system. Initially, a counting variable N is initialized by assignment of the value of zero thereto (102). Following initialization of the counting variable, it is determined if there are any hardware memory devices found in the system (104). A positive response to the determination at step (104) is followed by an increment of the counting variable (106). In one embodiment, an identifier may be assigned to the individual hardware memory devices as they are identified. Following step (106), the process returns to step (104) to determine if there are any unidentified hardware memory devices present in the system. Upon receipt of a negative response to the determination at step (104), the identification process is concluded by assigning the value of the counted hardware memory devices to the variable $N_{Total}$ (108). Accordingly, the first part of the process of management of hardware memory devices requires a count and/or identification of the individual hardware memory devices present in the system.

Figure 2:
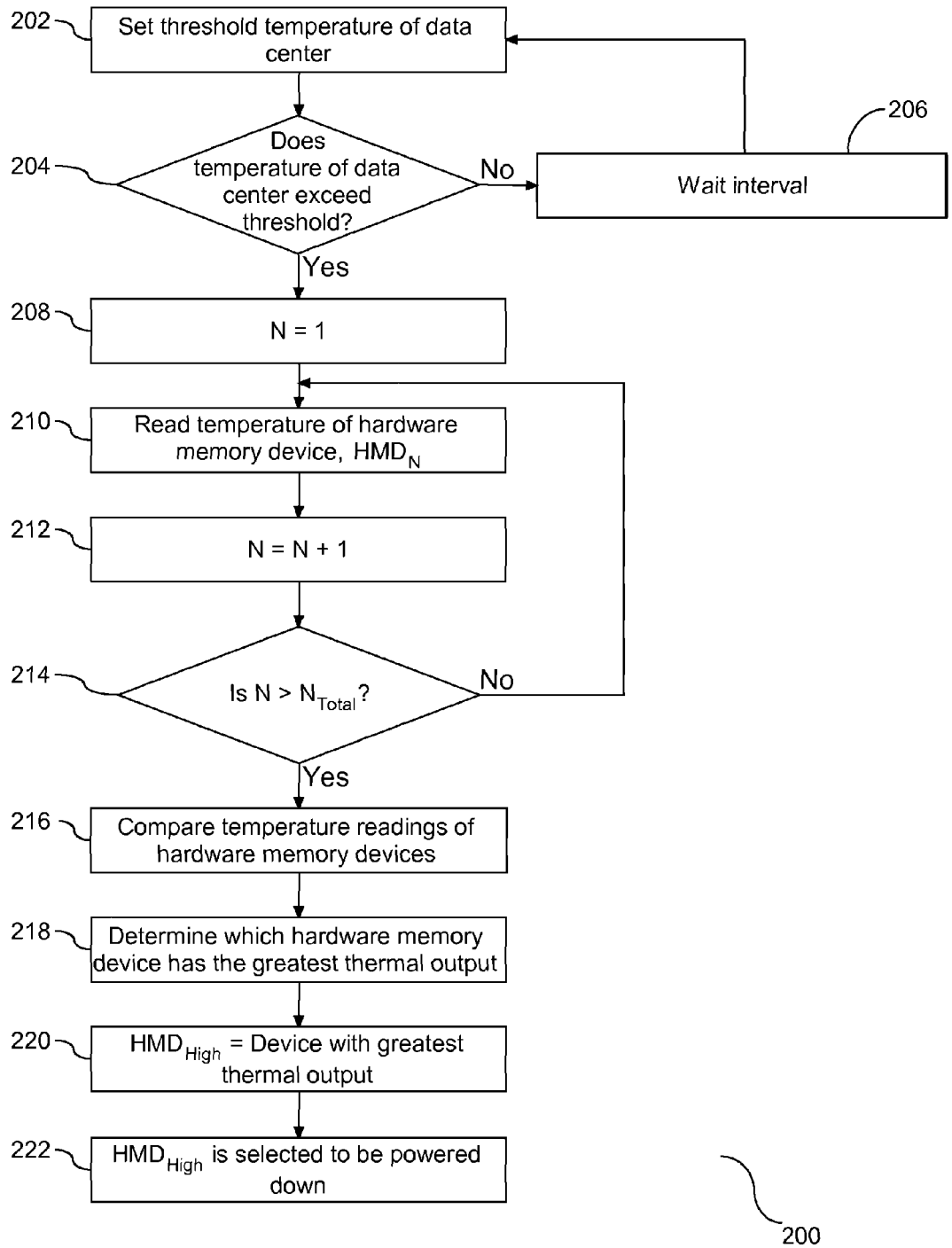
FIG. 2 is a flow chart illustrating a process for managing hardware memory devices.

Once all of the hardware memory devices have been counted and/or identified, control and management of the devices may be implemented. FIG. 2 is a flow chart (200) illustrating a process for managing hardware memory devices in association with the heat generated, i.e. energy exchange, by the individual devices as well as the data center wherein the computer system resides. Initially, a temperature goal of the data center is set (202). This temperature generally reflects a threshold value of the maximum temperature of the data center. Once the threshold value has been set, it is determined whether the temperature of the data center exceeds the set threshold (204). If the determination at step (204) indicates that the data center is operating within the threshold temperature setting, the data center continues to operate without modification to management of the hardware memory devices with respect to thermal management issues.

At periodic intervals (206), the thermal output of the data center is monitored. Thermal management techniques are initiated to bring the temperature of the data center to within the defined threshold at such time as the determination at step (204) indicates that the data center has exceeded the thermal output as defined by the temperature threshold,. As shown in FIG. 1, the total number of hardware memory devices in the data center is identified. The number identifying the total number of hardware memory devices present was assigned to the $N_{Total}$ (108). Following the determination at step (204) that the temperature of the data center has exceeded the defined threshold, the power consumption of the individual hardware memory devices is obtained. Recent developments in computer architecture support the ability to measure the power consumption and thermal characteristics of the system, including individual hardware memory devices. In one embodiment, this is supported by BIOS to provide access to the hardware memory device(s) through the operating system via Advanced Configuration and Power Interface (ACPI) or similar interfaces. The variable N is assigned to the value one (208), and the temperature for the first hardware memory device, $HMD_N$, is read (210). In one embodiment, the operating system probes the hardware memory devices and determines which hardware memory devices are experiencing the highest operating temperatures. Similarly, in one embodiment, a table or data structure is maintained for each of the identified hardware memory devices and their associated temperature reading. For example, as $HMD_N$ is read, the associated temperature is correlated to the hardware memory device and is stored in a table. The temperature reading at step (210) is for operating hardware memory devices and does not pertain to non-operating hardware memory devices. In one embodiment a temperature sensor employed at step (210) may not be directly associated with the hardware memory device(s). Rather the temperature sensor may be in close proximity to the device(s), such as at the motherboard or the chassis of the system. The actual location of the sensor is not critical, as long as there is a correlation between the temperature reading and the temperature of the hardware memory device(s). In one embodiment, temperature measurement may not be a thermometer, but a mechanism for measuring the relative temperature of the hardware memory devices, such as a fan speed indicator internal to the chassis. Following step (210), the variable N is incremented (212), followed by a determination as to whether the incremented variable N meets or exceeds the total quantity of identified hardware memory devices, $N_{Total}$ (214). A negative response to the determination at step (214) is followed by a return to step (210). Conversely, a positive response to the determination at step (214) is an indication that the temperature readings for each of the identified hardware memory devices have been accumulated. Accordingly, following a determination that the temperature in the data center exceeds a defined threshold, thermal management of the hardware memory devices requires reading the temperature of the individual hardware memory devices.

Once all of the temperature readings for the individual hardware memory devices have been accumulated, an algorithm to compare the temperature readings is implemented (216). The invention should not be limited to a specific comparison algorithm. In one embodiment, any standard algorithm for traversing a set of items can be used. Following the comparison, it is determined which hardware memory device has the greatest thermal output (218). The identified hardware memory device is assigned to the variable $HMD_{High}$ (220) and it is selected to be powered down by the operating system (222). In one embodiment, an algorithm may be employed to determine the hardware memory device with the lowest thermal output, i.e. $HMD_{Low}$. This allows $HMD_{Low}$ to be an option for selection for removal of power down by the operating system. Similarly, in one embodiment, more than one hardware memory device may be selected to be powered down. For example, if there are at least two hardware memory devices with a matching temperature for the greatest thermal output, then at least two hardware memory devices may be selected to be powered down. When more than one hardware memory devices is selected to be powered down, each of the hardware memory devices are individually identified. Alternatively, in one embodiment, only one of the at least two hardware memory devices may be selected to be powered down. As described above, the operating system designates one or more hardware memory devices to be powered down. In one embodiment, the operating system communicates a signal to the selected hardware memory device(s) at an appropriate time. Along a similar logic, the operating system may manage energy exchange by selecting to power down a memory bank, which may be a series of modules grouped together. Accordingly, one or more hardware memory devices may be identified and selected for power removal in response to comparison of temperatures with other accounted for hardware memory devices.

Figure 3:
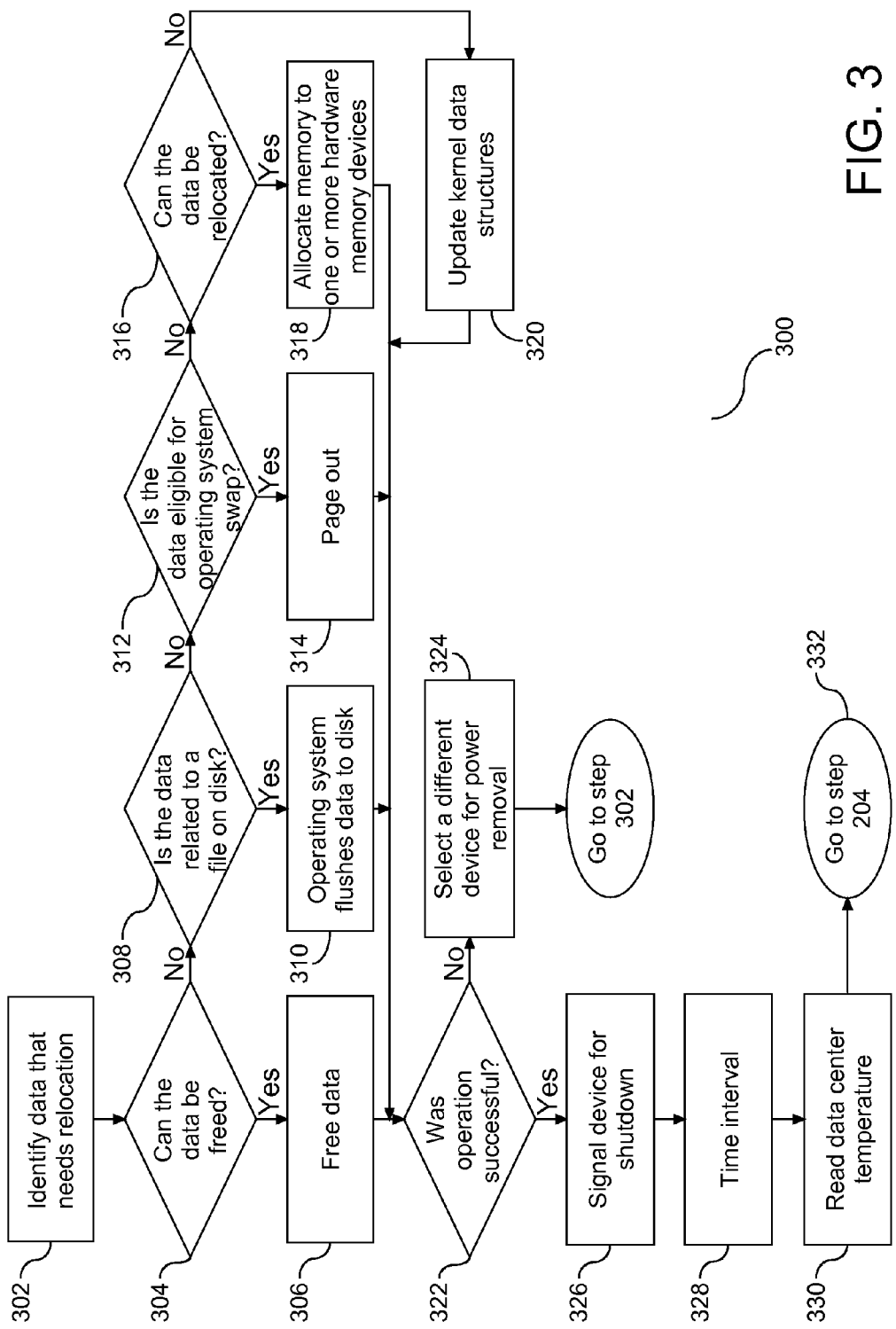
FIG. 3 is a flow chart illustrating a process for removing power from a designated hardware memory device.

For the purposes of disclosure, the description pertaining to actual removal of power from hardware memory devices will be selected with respect to an individual hardware memory device. FIG. 3 is a flow chart (300) illustrating a process for removing power from a designated hardware memory device. Prior to shutting down operation of a hardware memory device, resident data may need to be relocated. The physical memory packages residing on the selected hardware is correlated to the software usage of memory to identify the data that would need to be relocated to an alternative hardware memory device (302). In one embodiment, the operating system performs the correlation at step (302). Following the identification at step (302), it is determined if the data can be relocated to an alternative location so that the select hardware memory device can be powered down. There are several mechanisms that can be employed to relocate data that are illustrated herein. It is noted that the invention should not be limited to the mechanisms described herein. In one embodiment, an alternative memory relocation mechanism may be employed. One data relocation mechanism includes determining whether the data selected for relocation can be freed (304). Freed data is data that is not in use by part of the operating system or an application. The operating system knows whether or not the data can be freed. A positive response to the determination at step (304) results in the data being freed (306). However, a negative response to the determination at step (304) is followed by determining if the data selected for relocation is related to a file or part of a file on disk, or whether the data can be flushed to disk (308). In a similar manner to the determination at step (304), the operating system knows whether or not the data selected for relocation can be flushed to disk or is related to a file on disk. A positive response to the determination at step (308) is followed by the operating system flushing the subject data to disk (310). However, a negative response to the determination at step (308) is followed by a determination as to whether the data selected for relocation is eligible for an operating system swap (312), i.e. if the data can be stored in temporary space on disk. In a similar manner to the determination at step (304) the operating system knows whether or not the data selected for relocation is eligible for an operating system swap. A positive response to the determination at step (312) is followed by storing the selected data in temporary space on disk, i.e. page out the data. In contrast, a negative response to the determination at step (312) is followed by a subsequent determination as to whether the data identified for relocation can be relocated (316). In one embodiment, the operating system evaluates the hardware memory device prior to removal of data from the device. Accordingly, prior to powering down a hardware memory device, it is determined if the data stored thereon requires relocation.

The hardware memory designated for removal of power device may contain some critical data structures that may not be possible to be relocated. For example, a fully pageable O/S may enable migration directly, whereas a non-fully pageable O/S may not enable migration directly, i.e. would require use of an additional algorithm. Data that can be reasonably relocated to an alternative location is relocated. However, there may be data in the designated device that cannot be relocated. For example, pages of data that describe how the processors access critical system memory may not be moveable to an alternate memory device. On physical memory, memory is laid out in page tables and the operating system knows which pages of memory cannot be moved based upon how the page tables are laid out. If it is determined at step (316) that the identified hardware memory device contains critical data structures which cannot be relocated, kernel data structures which manage memory are updated to account for a memory hole and/or reduced memory size that will be created by removal of power from the selected hardware memory device (320). Following a positive response to the determination at step (316), the memory maintained on the identified device is allocated into one or more different hardware memory devices (318). Accordingly, data on a hardware memory device that can be relocated is transferred to an operating hardware memory device, and data that cannot be relocated is identified and accounted for.

In one embodiment, the operating system manages relocation of data from the designated hardware memory device prior to removal of power from the device. Following the memory allocation at steps (306), (310), (314) or (318), it is determined if the memory relocation or kernel data structures update (320) was successful (322). A negative response to the determination at step (322) is followed by selection of an alternative hardware memory device for removal of power (324), as shown in FIG. 2, and a return to step (302). Conversely, a positive response to the determination at step (322) is an indication that the memory on the hardware was successfully transferred to an alternate operating hardware memory device. Once the data transfer is completed, as indicated at step (322), the selected hardware memory device receives a signal to shut-down (326).

Temperature reduction in the computer data center is not immediate following removal of power from an exothermic device. A time interval is allowed to elapse (328) before the temperature of the data center is checked (330) to determine if one or more additional hardware memory devices will require removal of power to meet the data center temperature threshold (332). Accordingly, before removing power from a hardware memory device, the data stored on the device is relocated and accounted for so as not to significantly affect operation of the computer system and the temperature of the data center is re-checked.

Figure 4:
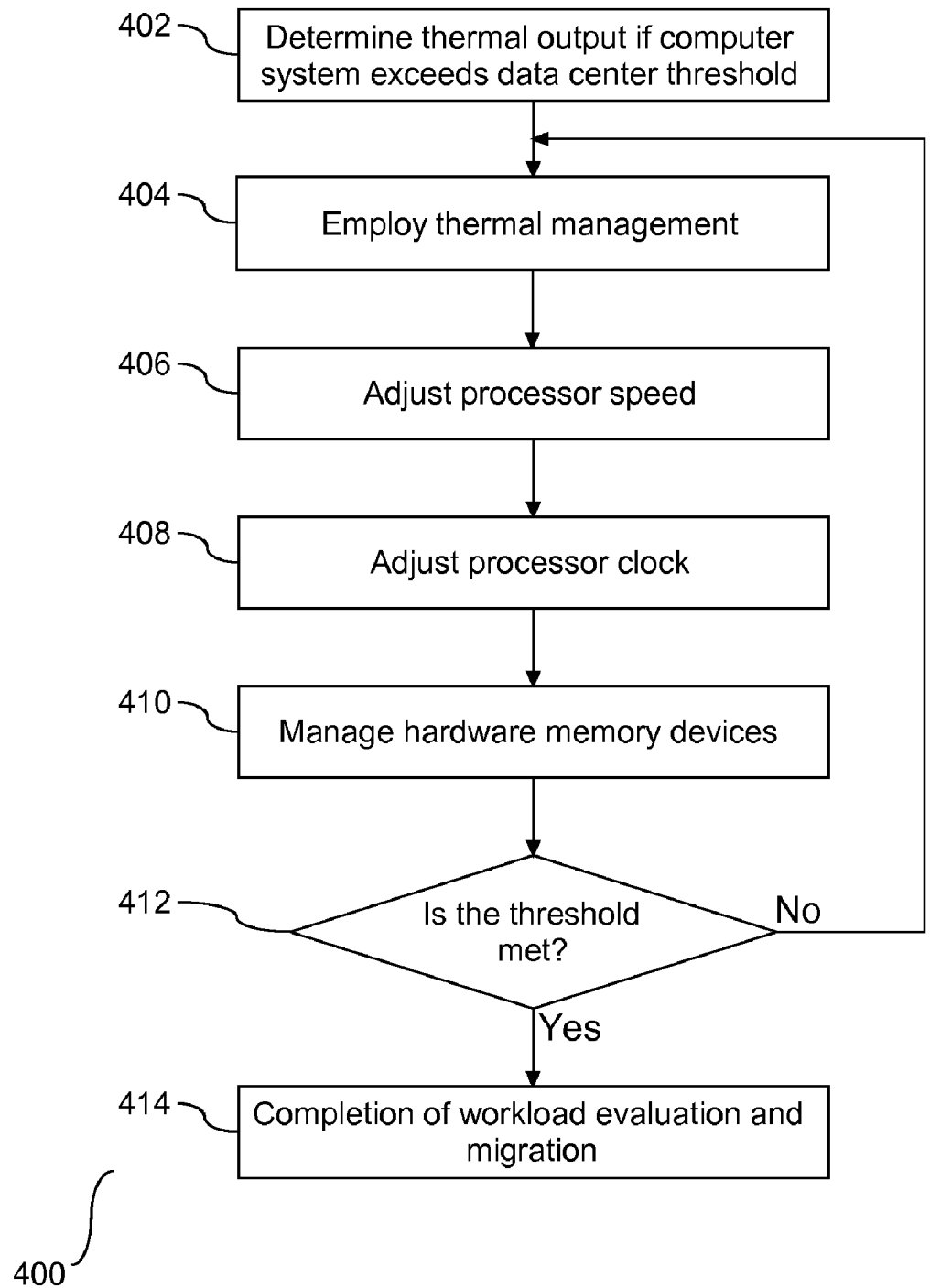
FIG. 4 is a flow chart illustrating thermal management and associated decision making by the operating system.

It is known that a data center housing the computer system may operate under the auspices of a service level agreement, hereinafter SLA, which includes in part a service contract where the level of service is formally defined. SLAs employed with data centers provide different levels of operation at different times of the day, week, month, year, etc. For example, it is known that there are times when a computer data center is experiencing high traffic periods, and low traffic periods. During high traffic periods there is greater utilization of resources, which will generally lend itself to a greater thermal output. Similarly, during low traffic periods there is a decreased utilization of resources, which lends itself to reduction of power of one or more elements therein to reduce thermal output. Thermal management of a data center in conformity with the terms of the SLA may require that the operating system have thermal management flexibility to meet the goals for thermal output while meeting the terms of the SLA. It is known in the art that the operating system may manage thermal output through adjustment of the clock speed, processor speed, and as described above, hardware memory management. FIG. 4 is a flow chart (400) illustrating thermal management and associated decision making by the operating system. Initially, it is determined that the thermal output of the computer system exceeds the defined threshold for the data center (402). Thermal management is employed to facilitate migration of workload within the computer system (404). One aspect for thermal management is to reduce thermal output by adjustment of the processor speed (406). Another aspect for thermal management is to reduce thermal output by adjustment of the processor clock (408). In addition, or alternatively, reduction of thermal output is employed through hardware memory management (410) as shown in FIGS. 2 and 3. Each of the thermal management techniques may be selected based upon the terms of the SLA to ensure conformity therewith. Following step (410), it is determined whether the thermal management techniques of steps (406), (408), and (410) have enabled the data center to meet the temperature threshold (412). A negative response to the determination at step (412) is following by a return to step (404) for further migration and/or reduction of the workload. Conversely, a positive response to the determination at step (412) is followed by completion of the workload evaluation and migration (414). Accordingly, thermal management may be necessitated and/or controlled by the terms of an SLA as well as a threshold temperature value for the data center.

Figure 5:
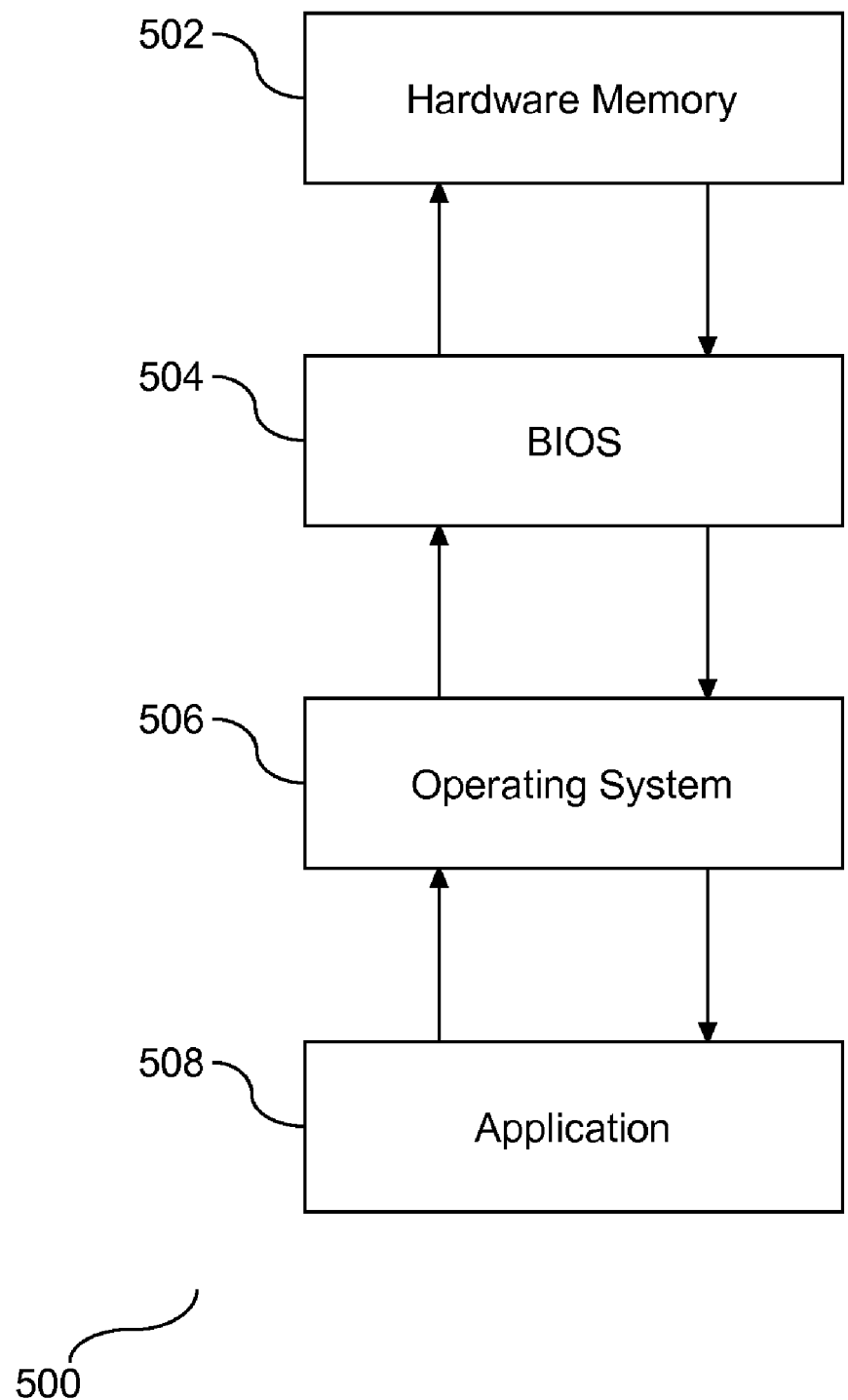
FIG. 5 is a block diagram showing an exemplary computer system abstraction layers.

As described above, in one embodiment the operating system determines relocation of memory from a selected hardware memory device. However, in one embodiment, the determination may be removed from the operating system and reside with the BIOS. The BIOS is built-in software that determines what a computer can do without accessing programs from a remote storage media. In one embodiment, the BIOS is placed on a ROM chip, also known as ROM BIOS. This ensures that the BIOS will always be available and will not be damaged by failure of the remote storage media. FIG. 5 is a block diagram (500) showing exemplary computer system abstraction layers. More specifically, as shown, there are the hardware elements (502) that have bi-lateral communication with the system BIOS (504). Similarly, the system BIOS (504) has bi-lateral communication with the operating system (506), which has bi-lateral communication with an application (508). The BIOS provides a standard interface to the operating system, and the operating system provides a standard interface to the application. In one embodiment, the BIOS is responsible for determining the feasibility of removing data from a hardware memory device. The BIOS serves as an interface between the operating system (506) and the hardware elements (502), which includes one or more hardware memory devices. FIGS. 2 and 3 are modified with the BIOS as the component in the system responsible for determining the feasibility of powering down one or more hardware memory devices. More specifically, based upon the determination by the BIOS, the operating system either complies with the request or responds to the BIOS with a counter-proposal. The BIOS may remove power from a designated hardware memory device in response to an approval from the operating system, and in response to completion of movement of data from the selected hardware memory device by the operating system. Accordingly, the BIOS may serve as an intermediary for evaluating the feasibility of removing power from one or more hardware memory devices.

In one embodiment, the invention is implemented in software, which includes but is not limited to firmware, resident software, microcode, etc. The invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

Figure 6:
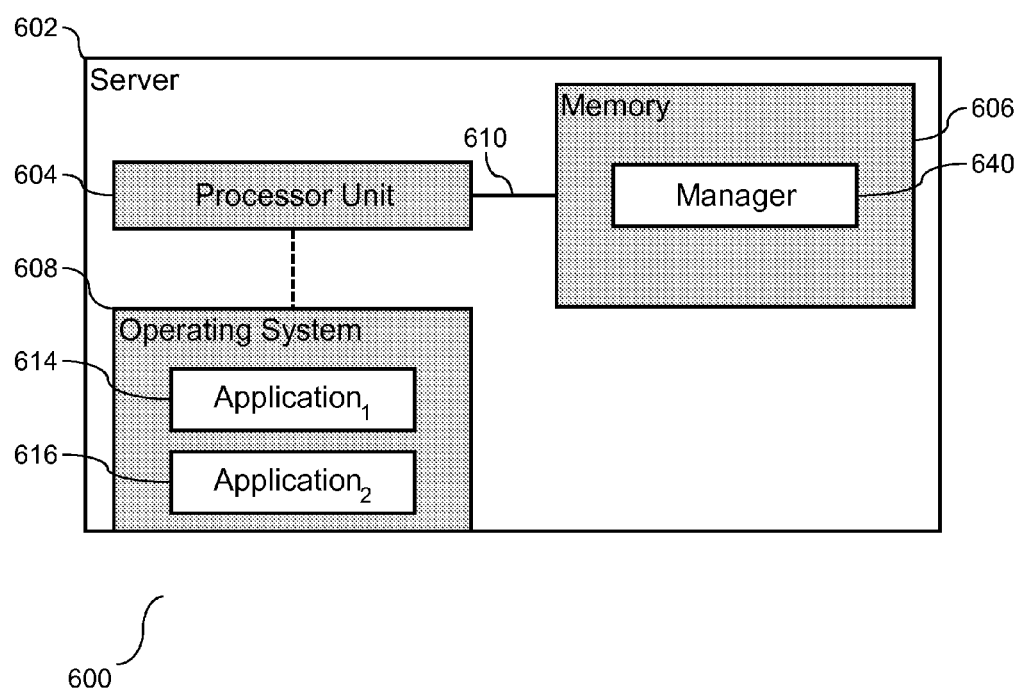
FIG. 6 is a block diagram illustrating placement of a hardware memory device management tool in a computer system according to the preferred embodiment of this invention, and is suggested for printing on the first page of the issued patent.

FIG. 6 is a block diagram (600) illustrating placement of a hardware memory device management tool in a computer system. The illustration shows a server (602) with a processor unit (604) coupled to memory (606) by a bus structure (610). Although only one processor unit (604) is shown, in one embodiment, the server (602) may include more processor units in an expanded design. As shown in FIG. 6, the server (602) may operate one or more applications (614) and (616) in an operating system (608) in communication with the processor unit (604). Although only two applications (614) and (616) are shown herein, the invention should not be limited to this quantity of applications. A hardware memory device management tool in the form of a manager (640) is shown residing in memory (606) of the server (602). The manager (640) mediates and facilitates shutting down one or more hardware memory devices, as described in detail in FIGS. 1-4 above. The manager (640) may utilize instructions in a computer readable medium to mediate communication with the operating system (608). In one embodiment, the manager (640) communicates with the operating system (608) through the BIOS (not shown). Although the manager (640) is shown residing in memory, the invention should not be limited to this embodiment. In one embodiment, the manager (640) may reside as a hardware tool external to memory (606), or it may be implemented as a combination of hardware and software. Accordingly, the manager (640) may be implemented as a software tool or a hardware tool to facilitate mediation and management of operation of hardware memory devices.

Embodiments within the scope of the present invention also include articles of manufacture comprising program storage means having encoded therein program code. Such program storage means can be any available media which can be accessed by a general purpose or special purpose computer. By way of example, and not limitation, such program storage means can include RAM, ROM, EEPROM, CD-ROM, or other optical disk storage, magnetic disk storage or other magnetic storage devices, or any other medium which can be used to store the desired program code means and which can be accessed by a general purpose or special purpose computer. Combinations of the above should also be included in the scope of the program storage means.

The medium can be an electronic, magnetic, optical, or semiconductor system (or apparatus or device). Examples of a computer-readable medium include a semiconductor or solid state memory, magnetic tape, a removable computer diskette, random access memory (RAM), read-only memory (ROM), a rigid magnetic disk, and an optical disk. Current examples of optical disks include compact disk B read only (CD-ROM), compact disk B read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks.

The software implementation can take the form of a computer program product accessible from a computer-useable or computer-readable medium providing program code for use by or in connection with a computer or any instruction execution system.

Advantages Over the Prior Art

Management of delivery of power to one or more hardware memory devices enhances thermal management of computer systems. It is known in the art that hardware memory devices are exothermic during operation in that they generate heat by-product. Furthermore, it is known in the art that computer workstations and associated data centers are concerned with thermal management issues. The prior art limits thermal management to the processor and does not address hardware memory devices. Furthermore, the prior art does not address or employ the operating system for power management of one or more internal hardware memory devices. By expanding thermal management to hardware memory devices, another layer of thermal management in an individual workstation and/or the data center as a whole is provided. In one embodiment, the operating system is employed to ascertain the temperature readings of the hardware memory devices and to modify operation thereof responsive to a temperature reading. Similarly, in another embodiment, the BIOS is employed as an intermediary between the operating system and the hardware memory device(s) to facilitate management thereof. In response to a request to shut-down operation of one or more selected hardware memory devices, the memory residing on the selected device that can be relocated is relocated prior to the shut-down. Similarly, data residing on the selected device that cannot be relocated is identified, and either associated kernel data structures are modified to accommodate the identified data, or an alternate hardware memory device is selected for removal of power. Accordingly, thermal management of hardware memory device identifies and manages data stored on a device selected to be shut-down prior to removal of power from the device.

Alternative Embodiments

It will be appreciated that, although specific embodiments of the invention have been described herein for purposes of illustration, various modifications may be made without departing from the spirit and scope of the invention. In particular, in one embodiment there may not be an alternate operating hardware memory device available to accept data transferred from a hardware memory device selected for power removal. However, there may be a hardware memory device that is in a non-operating condition. In such circumstances, the non-operating hardware memory device may be returned to an operating condition so that data from the hardware memory device selected for power removal may be transferred thereto. Furthermore, as noted above, the hardware memory devices are managed in response to a temperature exceeding a defined threshold. The temperature threshold may pertain to individual hardware memory devices and/or the cumulative temperature value of multiple hardware memory devices. Similarly, the temperature threshold may pertain to an individual computer workstation and/or a data center that houses one or more computer workstations.

As described above in detail, one or more hardware memory devices may be disabled in response to energy exchange data. In one embodiment, a subset of a hardware memory device, such as a subset of a chip, may be powered down. Alternatively, a select portion of a hardware memory device may be selected for removal or reduction of power. This may include the subset of a chip with the highest energy output or a subset of the chip with the lowest energy output. For example, an intelligent hardware memory device can power down a portion of the device, such as an addressable segment thereof. Power may be removed from the selected device or a portion thereof, or simply reduced. If a hardware memory device has a sleep state or partial shut-down option, these may be activated and/or made operable in response to selection for power reduction. These are exemplary policies that may be applied to this mechanism. As such, the invention should not be limited to the policies explicitly discussed herein. Accordingly, the scope of protection of this invention is limited only by the following claims and their equivalents.

We claim:

1. A computer system comprising:
   a processor;
   at least two hardware memory devices in communication with said processor;
   a tool to monitor energy exchange by said hardware memory devices;
   an operating system in communication with said processor, said memory devices, and said energy monitor tool, wherein said operating system selectively controls delivery of power to at least one of said memory devices responsive to a read of said energy monitor tool;
   at least one hardware memory device selected for a shut down, including relocating data from the selected device to a different hardware memory device prior to the shut down, identifying data on the selected device that can not be relocated based upon its content prior to the shut down, modifying a kernel data structure to account for the data that can not be relocated prior to the shut down of the selected device, and shutting the selected device down in response to said kernel modification.

2. The computer system of claim 1, further comprising said operating system to transfer data from one of said devices selected by said operating system for reduction of power to an alternate operating hardware memory device.

3. The computer system of claim 2, further comprising said operating system to reduce power from said hardware memory device designated for power reduction after data transfer is completed.

4. The computer system of claim 2, wherein said alternative hardware memory device is selected from the group consisting of: an operating device, and a device made operable prior to reduction of power to said alternate hardware memory device.

5. The computer system of claim 1, wherein said control of power delivery to said memory devices is responsive to energy output of at least one said memory devices exceeding a threshold value.

6. The computer system of claim 5, wherein said threshold value is based upon a cumulative energy value of said hardware memory devices.

7. A method for managing memory hardware devices of a computer system, comprising:
   monitoring an energy exchange reading of hardware memory devices;
   communicating instructions to control delivery of power to at least one of said hardware memory devices responsive to said monitored energy reading; and
   an operating system selecting at least one hardware memory device for a shut down, including relocating data from the selected memory device to a different memory device prior to the shut down, identifying data on the selected device that can not be relocated based upon its content prior to the shut down, modifying a kernel data structure to account for the data that can not be relocated prior to the shut down of the selected device, and shutting the selected device down in response to said kernel modification.

8. The method of claim 7, further comprising transferring data from one of said devices selected for reduction of power to an alternate operating hardware memory device.

9. The method of claim 8, further comprising reducing power from said hardware memory device designated for power reduction after data transfer is completed.

10. The method of claim 8, wherein said alternative hardware memory device is selected from the group consisting of: an operating device, and a device made operable prior to reduction of power to said alternate hardware memory device.

11. The method of claim 7, wherein the step of controlling of power delivery to said memory device is responsive to energy output of at least one said memory devices exceeding a threshold value.

12. The method of claim 11, wherein said threshold value is based upon a cumulative energy value of said hardware memory devices.

13. The method of claim 7, wherein an operating system in communication with said processor and said memory devices communicates the instructions to control delivery of power to at least one of the hardware memory devices.

14. The method of claim 13, further comprising a BIOS for selecting at least one of said hardware memory device for reduction of power, and said BIOS to communicate said selection to said operating system, said operating system responding to the BIOS with an action selected from the group consisting of: complying with the request and providing a counter-proposal.

15. The method of claim 7, further comprising selecting a different memory device for the shut down responsive to an event selected from the group consisting of: a data relocation failure and a kernel data update failure.

16. An article comprising:
   a computer readable carrier including computer program instructions configured to manage hardware memory devices comprising:
   instructions to monitor an energy exchange reading of hardware memory devices;
   instructions to control delivery of power to at least one of said hardware memory devices responsive to said monitored energy exchange reading; and
   instructions to select at least one hardware memory device for a shut down, including relocating data from the selected device to a different memory device prior to the shut down, identifying data on the selected device that can not be relocated based upon its content prior to the shut down, modifying a kernel data structure to account for the data that can not be relocated prior to the shut down of the selected device, and shutting the selected device down in response to said kernel modification.

17. The article of claim 16, further comprising instructions to transfer data from one of said devices selected for reduction of power to an alternate operating hardware memory device.

18. The article of claim 17, further comprising instructions to reduce power from said hardware memory device designated for power reduction after data transfer is completed.

19. The article of claim 16, wherein the instructions to control power delivery to said memory device is responsive to energy exchange of at least one said memory devices exceeding a threshold value.

20. A method for managing hardware memory devices of a computer system, comprising:
- a BIOS in communication with at least two components of a hardware memory device and an associated operating system;
- monitoring an energy exchange reading of said hardware memory device;
- communicating a request from said BIOS to an operating system to control delivery of power to at least one of two components of the hardware memory device responsive to said monitored energy reading, said operating system responding to the BIOS with an action selected from the group consisting of: complying with the request and providing a counter-proposal; and
- selecting at least one of the components of the hardware memory device for a shut down, including relocating data from the selected device to a different memory device prior to the shut down, identifying data on the selected device that can not be relocated prior to the shut down based upon its content, modifying a kernel data structure to account for the non-relocated data prior to the shut down of the selected device, and shutting the selected device down in response to said kernel modification.

* * * * *